United States Patent

Kurahashi et al.

[11] Patent Number: 5,271,007
[45] Date of Patent: Dec. 14, 1993

[54] NETWORK SYSTEM HAVING CONTROLLED ACCESS TO AVAILABLE RESOURCES

[75] Inventors: Masayuki Kurahashi; Takahiro Saito; Toshiaki Yoshinari; Masahiro Maeda; Kazuya Yamada, all of Kanagawa, Japan

[73] Assignee: Fuji Xerox Co., Ltd., Tokyo, Japan

[21] Appl. No.: 763,589

[22] Filed: Sep. 23, 1991

[30] Foreign Application Priority Data

Dec. 25, 1990 [JP] Japan .................... 2-405873

[51] Int. Cl.$^5$ .................... H04L 12/40; G06F 12/14
[52] U.S. Cl. .................... 370/85.1; 395/600
[58] Field of Search ............ 370/85.1, 91, 92, 94.1, 370/94.3; 380/4, 23, 25; 395/600

[56] References Cited

U.S. PATENT DOCUMENTS

| | | | |
|---|---|---|---|
| 4,104,718 | 8/1978 | Paublan et al. | 395/600 |
| 5,012,405 | 4/1991 | Nishikado et al. | 395/600 |
| 5,124,984 | 6/1992 | Engel | 370/94.1 |
| 5,163,147 | 11/1992 | Orita | 395/600 |

Primary Examiner—Douglas W. Olms
Assistant Examiner—Hassan Kizou
Attorney, Agent, or Firm—Finnegan, Henderson, Farabow, Garrett & Dunner

[57] ABSTRACT

A network system in which a plurality of information devices connected to each other through a network are provided so that a resource is released to the information devices through the network, the system comprising: a storage device for storing an access list indicating an access right for every information device of release destination; and a management device for releasing a resource within a range in accordance with a right given to every information device on the basis of the access list stored in the storage device.

2 Claims, 1 Drawing Sheet

NETWORK SYSTEM HAVING CONTROLLED ACCESS TO AVAILABLE RESOURCES

BACKGROUND OF THE INVENTION

1. Field of the Invention

The present invention relates to a network system, and particularly to a network system for automatically maintaining the environment of investigation and/or development of software in a large-scaled portion or in distant places to thereby improve the efficiency of the investigation and/or development.

2. Description of the Prior Art

For example, investigation and/or development may be performed by a large number of persons, with files to be shared by a plurality of persons being put in a shared file server so that the persons may use the files. Further, in a large-scaled project, it may become necessary that files be shared by a plurality local area networks (LANs), and a plurality of file servers (shared file servers) having the same contents are prepared and provided in areas in which the sharing of files is required.

When the shared files are corrected or when the number of shared files is increased, however, there has been a problem in that since it is necessary to renew the shared files manually, much labor is required for the management of the shared file servers.

Then, it has been proposed that the efficiency of software investigation and/or development is improved by automatically maintaining the environment of the software investigation and/or development.

There has been proposed a network system having a plurality of file storage means connected to each other through a network, in which, for example, means for storing files corresponding to each other into each of the plurality of file storage means and a memory means for memorizing the respective states of the files stored in each of the file storage means are provided, so that when a change in contents of the files corresponding to each other is detected on the basis of the memory means, a management means manages the file storage means so as to make the contents of the files corresponding to each other coincide with each other.

In this network system, there are provided release servers each constituted by a controlling device, a memory device, and a communication device. In each release server, a release map indicating the existing positions, etc. of files is stored in the memory device, so that the controlling device performs file transfer between the release server and the file servers connected to an LAN on the basis of the release map by using the communication device. The release maps in the respective release servers are referred to each other, and if there exists a difference therebetween, the release maps are rewritten that those release maps are made to coincide with each other. As a result, the identity of the contents of the files in the file servers is kept.

In the foregoing network system, the contents of the files in the plurality of file servers connected to each other through the network are automatically maintained so as to be always coincident with each other and it is therefore possible to automatically keep the environment of software investigation and/or development which has been conventionally troublesome. Accordingly, the efficiency of the software investigation and/or development can be improved.

To the network, however, not only information equipment belonging to a section concerning to the software investigation and/or development but information equipment belonging to a section which is not permitted to make access to the software. It is therefore necessary to make a limit in access to the software to be released. In the conventional network system, therefore, users who are allowed to make access to files of software have been set in advance and an access right has been set for every file. Further, there are two kinds of access rights, one being a right allowing writing and reading, the other being a right allowing only reading.

According to the system in which an access right is set for every file and for every user, however, it is impossible to manage software surely for the following reasons.

First, it is necessary that software to be installed into information equipment is to be adapted thereto. That is, there is a case where some software does not operate because of the difference in kind or version of an operating system or because of the problem of matching between the operating system and the software, when the form of the software is not adapted to the equipment regardless of the kind of the software. Consequently, the management on software cannot be realized by the management on the access right for users, and it is necessary that the software is managed by the information equipment into which the software is to be installed.

Secondly, if an access right is given to a user, the user having the access right can copy the software into any information equipment. As a result, use of the software is allowed with no permission.

In the conventional software, the access right has been managed for a user or a user group in view of the construction of a file system in which the software is stored. It has been therefore impossible to perform access management on information equipment.

SUMMARY OF THE INVENTION

It is therefore an object of the present invention to provide a network system in which when software is automatically released through a network, an access right for accessing software is set onto information equipment, so that software adapted to the kind and environment of the equipment of release destination is released within a range permitted to the release destination, thereby performing software management surely.

In order to attain the above object, according to the present invention, a network system in which a plurality of information devices connected to each other through a network are provided so that a resource is released to the information devices through the network, comprises: a storage means for storing an access list indicating an access right for every information device of release destination; and a management means for releasing a resource within a range in accordance with a right given to every information device on the basis of the access list stored in the storage means.

DETAILED DESCRIPTION OF THE PREFERRED EMBODIMENT

Figure 1:
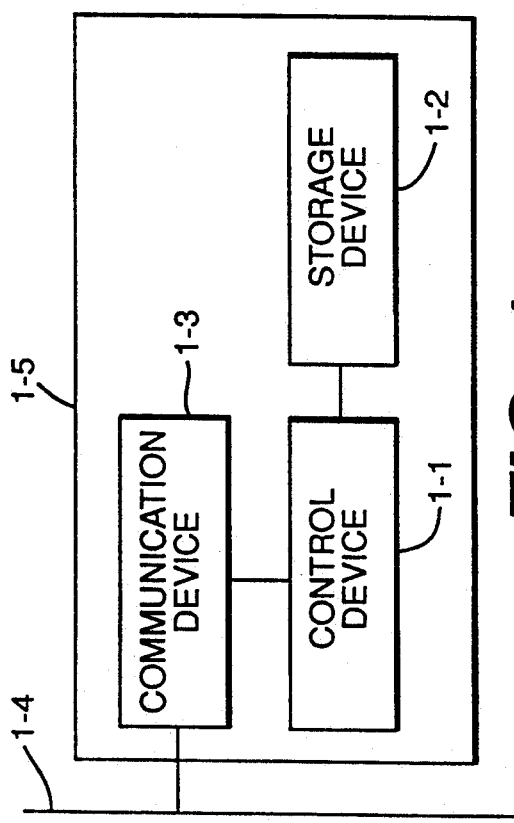
FIG. 1 is a schematic diagram for explaining the present invention.

FIG. 1 schematically shows the configuration of a release server to be used according to the present invention. First, referring to FIG. 1, the operation of the present invention will be described in brief. A release server 1-5 is constituted by three parts, that is, a controlling device 1-1, a storage device 1-2, and a communication device 1-3. Software information to be released is stored in the storage device 1-2, and a table of correspondency between the name of software and the name of information equipment to which the software is to be provided is stored in the controlling device 1-1. The software information stored in the storage device 1-2 is supplied, by the controlling device 1-1, through the communication device 1-3 and an LAN 1-4, to information equipment, for example, a workstation or the like, to which the software is to be released. At this time, judgement is made as to whether the software is allowed to be supplied to the information equipment or not, by the controlling device 1-1 having the table of correspondency between the name of software and the name of information equipment to which the software is to be supplied.

Next, referring to the accompanying drawings, the features of the present invention will be specifically described.

Figure 2:
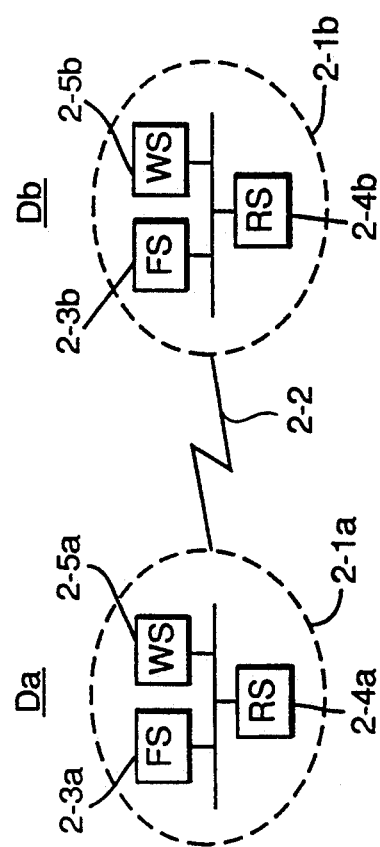
FIG. 2 is a diagram showing the configuration of an embodiment of the present invention.

FIG. 2 shows an embodiment of the network system according to the present invention.

In this embodiment, the network system has two LANs 2-1a and 2-1b constituting domains Da and Db respectively. In the LANs 2-1a and 2-1b, there are provided file servers (FS) 2-3a and 2-3b, release servers 2-4a and 2-4b, and workstations 2-5a and 2-5b respectively. The LANs 2-1a and 2-1b are connected to each other through a network communication system 2-2 such as a public line or the like.

Here, in order to simplify the explanation, assume that the two release servers 2-4a and 2-4b are releasing software in the two domains Da and Db respectively. On this assumption, software named "SOFT XXX" including the source is provided in the workstation (WS) 2-5a of the domain Da while the software "Soft XXX" of only binary data is provided in the workstation 2-5b of the domain Db.

The source level software described in the present specification includes the source code of the software. There are generally two kinds of software. One provides a source code form and an execution or binary form, and the other kind of software provides only an execution or binary form.

Usually, marketed software is provided only in the execution form, and does not include a source code (to prevent modification of the software or the release of knowledge of the software technique). Also, the binary software has different forms for different kinds of execution devices, and such binary software can only be operated by the kind of device for which it is designed.

The binary software is executable, but the program normally cannot be corrected or adapted for use on other computers. Further, a binary file is essentially not readable and thus cannot serve as a resource for analyzing the algorithm within the software. Thus it is desirable to be able to limit user access to the software according to whether the use has authority for source and binary software use or only for binary software use.

In the present invention, the source and binary software are stored in the storage device 1-2. An access list, listing available software resources and respective access rights thereto for the various information devices, is saved in the control device 1-1. The access list is managed by the management means.

Conventionally, the software contained in a magnetic tape or a CDROM is carried to a work station and installed therein, or a copy of the software is transmitted to a first work station from a second work station which is online to the first work station, and installed therein. In the former case, the software medium is supplied to the work station upon consent to use the software. In the latter case, it is necessary to provide a read right to obtain exterior access to the software file.

In order to realize such release in which access is limited, each of the release servers (RS) 2-4a and 2-4b has a table called an access list for every resource (for every software in this embodiment). That is, the access list is formed for every resource to be released, and is managed in each of the release servers 2-4a and 2-4b. The access list stored in each of the release servers 2-4a and 2-4b manages the contents of access right to the resources belonging to the workstation managed by the release server in the domain. Table 1 shows an example of the contents of an access list for the resource "SOFT XXX" in the domain Da, and Table 2 shows an example of the contents of an access list for the resource "SOFT XXX" in the domain Db.

TABLE 1

| Workstation identifying code | Access right |
| --- | --- |
| WS1 | source |
| WSXXX | binary |
| ... | ... |

TABLE 2

| Workstation identifying code | Access right |
| --- | --- |
| WS2 | binary |
| WSYYY | binary |
| ... | ... |

In the access list of Table 1, it will been seen that the workstation 2-5a having an identifying code "WS1" has an access right on the resource "SOFT XXX" to the source level thereof, while a workstation (not shown) having an identifying code "WS XXX" has an access right on the same resource "Soft XXX" only to the binary level. Therefore, the release server 2-4a for managing the domain Da supplies the workstation 2-5a with the resource "SOFT XXX" to the source level thereof while supplies the workstation having the identifying code "WS XXX" with the resource "SOFT XXX" only to the binary level thereof. The access right to the source level means that it is possible to make an access to the software at a binary level as well as at a source level.

As seen from the access list of Table 2, on the other hand, the workstation 2-5b having an identifying code "WS2" is supplied with the resource "SOFT XXX" only to the binary level. Therefore, the release server 2-4b for managing the domain Db releases the resource "SOFT XXX" only to the binary level for the workstation 2-5b in the domain Db.

Thus, an access list manages an access right on a resource for a workstation in a domain. In the release server for managing each of the domains, it is possible to freely change the setting of an access right by rewriting an access list.

Figure 3:
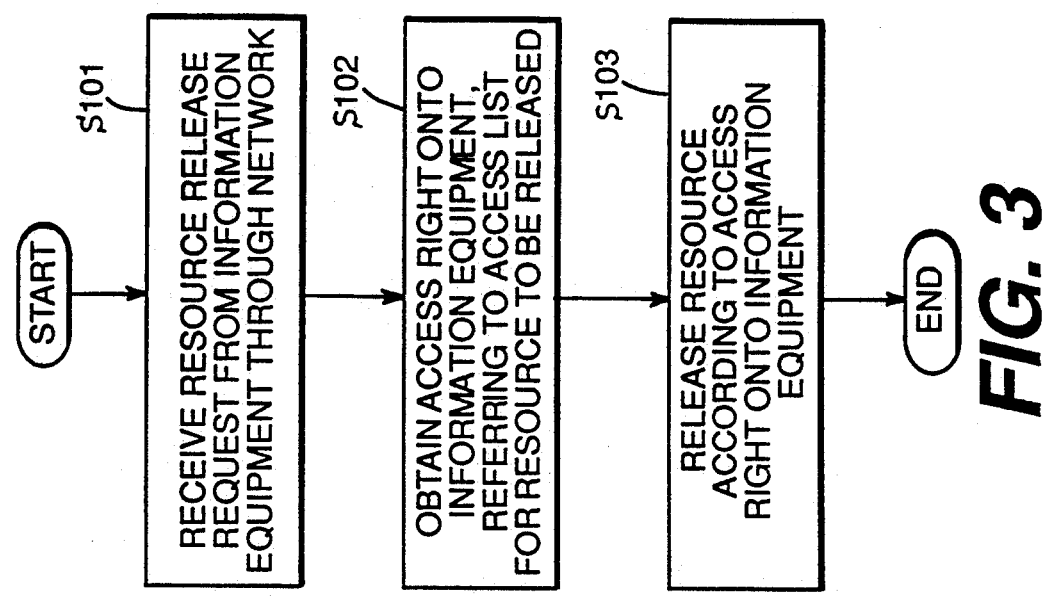
FIG. 3 is a flowchart for explaining the release operation in the network system according to the present invention.

FIG. 3 is a flowchart for explaining the release processing using an access list in the release server.

Upon the reception of a resource release request from information equipment such as a workstation or the like through the network (in the step 101), the release server refers to the access list for the resource to be released to thereby obtain the access right onto the information equipment (in the step 102). Next, the release server releases the resource in accordance with the access right onto the information equipment which has issued the release request (in the step 103).

Although software has been described as the resource to be released by way of example in the foregoing embodiment, the present invention is not limited to this, but the invention is applicable to any resource as long as it can be sent through a network. Further, it is not necessary that the access right on the resource is limited to a source level or a binary level. In short, it is sufficient that the limit with which the the release server can release a resource is made clear. For example, in the case where a certain software package is to be released, a designation can be made so as to restrict the function of the release package depending on an information equipment for which the software package is to be released. In this case, however, it is necessary to provide a table of correspondency between the functions of the software package and the modules which constitute the software package.

Although description has been made as to the case where each of the release servers has an access list in the foregoing embodiment, the access lists may be collectively managed by one of the release servers. In this case, renewal of an access right on a resource is performed only in the one release server, which the other release servers make confirmation of the access right to the one release server which collectively manages the access right.

Further, it is possible to restrict the contents of release for every release destination by adding information indicating a limit of release for every release destination to each resource to be released by the release server.

As described above, according to the present invention, it is possible to cause a release server to release a resource to a level in accordance with every release destination, whereby the management of software can be surely performed. Further, in a release server for managing each of domains, the setting of an access right can be freely changed by rewriting an access list.

What is claimed is:

1. A system in which a plurality of information devices are connected to each other through a network with source and binary software resources being releasable from a release server for access by said information devices through said network, said system comprising:
   storage means for storing the software resources; and
   management means for storing an access list for the source and binary software resources and for releasing requested software resources from said storage means in accordance with access rights given to every information device on the basis of said access list stored in said management means.

2. A system in which a plurality of workstations are connected to each other through a network with source and binary software resources being releasable from a release server for access by said workstations through said network, said system comprising:
   a plurality of release servers provided on said network for controlling release of said source and binary software resources, at least one of said release servers having an access list indicating whether a requested source or binary software resource is to be supplied to one of said workstations to which software resources may be released so that when a request for releasing a source or binary software resource is issued from said one workstation, said one release server refers to said access list to determine whether to release the requested software resource in accordance with the access rights given to said one work station.

* * * * *